July 22, 1952  A. K. SOPER  2,604,398
LIGHT-SENSITIVE PHOTOGRAPHIC STRIPPING FILM
Filed Feb. 13, 1947
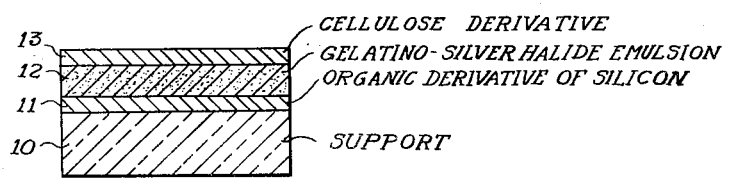
ALAN K. SOPER
INVENTOR.
BY
ATTORNEYS Patented July 22, 1952

2,604,398

UNITED STATES PATENT OFFICE 2,604,398

LIGHT-SENSITIVE PHOTOGRAPHIC STRIPPING FILM

Alan Kingston Soper, Wealdstone, England, assignor to Eastman Kodak Company, Rochester, N. Y., a corporation of New Jersey Application February 13, 1947, Serial No. 728,373
In Great Britain February 21, 1946

2 Claims. (Cl. 95—8)

This invention relates to the production of photographic materials, especially sensitive materials such as stripping films or papers.

In the production of photographic stripping materials, it has previously been the practice to treat the temporary support, i. e., the support from which stripping is desired, by coating it with a solution of a stripping compound, drying the coated support and then applying the sensitive layer over the layer of stripping compound. The stripping compound may be a wax, a resin, or a substance soluble in alkali, in acid or in hot or cold water. In all such processes, the application of the stripping compound represents a distinct manufacturing operation, and is often time-consuming and costly. In addition, the use of waxes or resins for such purposes usually necessitates the use of organic solvents, with their attendant hazards such as fire, explosion and toxicity.

The object of this invention is to provide a novel method of producing layers of hydrophilic colloid binders, such as gelatine. Another object is to provide an improved method for the production of photographic stripping materials which eliminates the step of coating the support with the stripping compound as described above. Yet another object is to provide novel photographic stripping materials. These and other objects will be apparent from the following specification.

The accompanying drawing shows a sectional view of a material made according to my invention.

The present invention provides a method of producing a layer of a hydrophilic colloid binder which can be dry-stripped from a support, comprising treating the surface of the support with an organic derivative of silicon which imparts water-repellant properties to such surface and forming the said colloid layer on such treated surface by coating directly thereon an aqueous dispersion of a hydrophilic binder.

By water-repellant I mean that the support does not become appreciably wet if the side so treated is placed in contact with plain water for a few seconds after treatment. In a preferred form of the invention the support 10 is treated with the vapour of an organic derivative of silicon which decomposes on contact with water contained in, or associated with the support and deposits thereon a layer 11 conferring water-repellant properties on the support. The derivatives of silicon which may be used are preferably the organic halogen derivatives which decompose in contact with water. Compounds especially suitable are the alkyl, aryl or aralkyl halogeno-silanes (also termed silicanes), such as trialkyl chlorsilanes, and methyl chlorsilane. It is possible to hydrolyse such compounds on the support and thereby produce a thin surface layer of a water-repellant compound thereon and such methods of producing water-repellant layers are well known.

It is only necessary that the support to be treated should contain, or be associated with, sufficient water to promote slight hydrolysis of the silane, and for this purpose, the water naturally present in paper is ample.

The layer 11 is coated with a hydrophilic layer 12 such as a gelatino silver halide emulsion layer, which may have an overcoating layer 13 of a cellulose derivative to facilitate stripping.

An example of the use of such a process is as follows:

A 100 gram per square metre document type paper is passed rapidly over a trough containing methyl chlorsilane in such a way that the paper forms the lid of the trough, thus keeping the methyl chlorsilane free from contact with air. The speed of traverse of the paper is so adjusted that each portion is acted upon for a minimum time of one second. The paper so treated is immediately passed to the standard type of paper coating equipment, common in the photographic industry, and coated with a process type gelatino-silver halide emulsion, to give a final dried layer thickness of emulsion of about ten $\mu$. The emulsion layer is applied to the treated side of the paper. After the emulsion is dry, it is overcoated with a nitrocellulose layer from a solution of the following composition:

| | | |
|---|---|---|
| Cellulose nitrate (½ second) | grams | 10.0 |
| Tricresyl phosphate | grams | 1.5 |
| Triphenyl phosphate | grams | 3.5 |
| Acetone | cc | 100 | to give a dried layer of one thousandth of an inch in thickness. This overcoating layer is provided to facilitate the transfer of the emulsion layer to any desired support in the well-known manner.

The resultant product is one suitable for the production of templates and the like by the process described in British Patent Specifications Nos. 553,341, 554,292, 554,298, 554,300 and 554,301, in which a silver halide emulsion layer is transferred to a metal permanent support and the temporary support is stripped off prior to processing. The material of the present invention may also be used for other known applications of dry-stripping materials in which the temporary support is stripped off after processing. When a material with a paper temporary support is required which will withstand processing prior to stripping it is desirable to regulate the amount of silicon compound used and to select a paper with a suitable texture and surface since with a paper having a highly glazed surface there is a greater tendency for the sensitive layer to leave the temporary support during processing.

Although my invention has been described mainly with reference to the use of sensitive emulsion layers and paper supports it should be understood that the scope of the invention is not limited to the use of such materials. Thus, there may be used any support material such as glass or films of cellulose derivative or synthetic resin. Obviously, where the support contains no water, or insufficient water to produce the hydrolysis of the silicon derivative, the support may be subjected to the action of water or water-vapour before or after treatment with the silicon compound. Also there may be used any desired colloid binder which may or may not be rendered light-sensitive as desired, or the colloid may form the binder of sensitive photographic emulsion, e. g. a silver halide emulsion. Suitable binders are gelatine, polyvinyl alcohol, polyvinyl acetal, regenerated cellulose, or the like.

In the present specification and claims when I refer to a layer capable of being dry-stripped from a support I mean that the layer and the support may be separated by simply pulling them apart in the dry state at room temperature, the layer being thereby completely removed as a whole.

In a useful modification of the invention a photographic support such as paper is treated with an organic derivative of silicon in the manner previously described, preferably on both sides thereof, and over the treated surface there is coated a layer of sensitive photographic emulsion which is not necessarily adapted to be stripped from the support before or after processing.

Such materials are particularly valuable where rapid processing is required, since the treatment with the organic derivative of silicon has the effect of water-proofing a support which might otherwise absorb water and so prolong the time required to dry the processed material. In the materials prepared according to this invention the support does not absorb water and so the processing time is reduced to a minimum.

Having thus described my invention, what I claim is:

1. A sensitive photographic stripping material comprising a support, a surface layer of water-repellant organic derivative of silicon on said support, a sensitive silver halide emulsion layer coated thereon and capable of being completely stripped therefrom by pulling apart at room temperature in the dry state.

2. A sensitive photographic stripping material comprising a temporary support, a surface layer of water-repellent organic derivative of silicon on said support, a sensitive gelatino-silver salt emulsion layer coated thereon and capable of being completely stripped therefrom by pulling apart at room temperature in the dry state and an overcoating of cellulose derivative on the said silver halide emulsion layer.

ALAN KINGSTON SOPER.

REFERENCES CITED

The following references are of record in the file of this patent:

UNITED STATES PATENTS

| Number | Name | Date |
|---|---|---|
| 2,306,222 | Patnode | Dec. 22, 1942 |
| 2,388,299 | Thielemann | Nov. 6, 1945 |
| 2,436,304 | Johannson | Feb. 17, 1948 |
| 2,438,736 | Barry | Mar. 30, 1948 |
| 2,445,572 | Gerould et al. | July 20, 1948 |
| 2,477,787 | Cook | Aug. 2, 1949 |

FOREIGN PATENTS

| Number | Country | Date |
|---|---|---|
| 18,430 | Great Britain | of 1899 |
| 166,686 | Great Britain | July 19, 1921 |